United States Patent
Krebs et al.

(10) Patent No.: US 8,662,273 B2
(45) Date of Patent: Mar. 4, 2014

(54) DUAL CLUTCH

(75) Inventors: Florian Krebs, Baden-Baden (DE);
Oliver Noehl, Buehlertal (DE); Rene Daikeler, Buehlertal (DE); Bernhard Wolf, Baden-Baden (DE); Luben Krahtov, Baden-Baden (DE); Daniel Bosnjak, Seltz (FR); Ivo Agner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/617,214

(22) Filed: Sep. 14, 2012

(65) Prior Publication Data
US 2013/0025994 A1 Jan. 31, 2013

Related U.S. Application Data

(63) Continuation of application No. PCT/DE2011/000266, filed on Mar. 15, 2011.

(30) Foreign Application Priority Data

Mar. 25, 2010 (DE) .......................... 10 2010 012 862

(51) Int. Cl.
*F16D 21/06* (2006.01)
*F16D 25/10* (2006.01)

(52) U.S. Cl.
USPC .................. 192/48.606; 192/48.8; 192/85.53; 192/115

(58) Field of Classification Search
USPC ............ 192/48.606, 85.49, 85.51, 85.53, 115
See application file for complete search history.

(56) References Cited

U.S. PATENT DOCUMENTS

| | | | | | |
|---|---|---|---|---|---|
| 4,456,111 | A | * | 6/1984 | Limbacher ................. | 192/85.52 |
| 6,634,477 | B2 | * | 10/2003 | Beneton et al. ............. | 192/48.8 |
| 7,493,997 | B2 | * | 2/2009 | Meinhard et al. ........... | 192/30 V |
| 2010/0006386 | A1 | * | 1/2010 | Ahnert et al. ................ | 192/48.8 |
| 2011/0114435 | A1 | * | 5/2011 | Noehl et al. ................. | 192/48.1 |

FOREIGN PATENT DOCUMENTS

| DE | 102009030975 A1 * | 1/2010 |
|---|---|---|
| EP | 1524446 A1 * | 4/2005 |

OTHER PUBLICATIONS

Machine translation of EP 1524446 downloaded from www.espacenet.com on Mar. 7, 2013.*

\* cited by examiner

*Primary Examiner* — Richard M. Lorence
(74) *Attorney, Agent, or Firm* — Lucas & Mercanti, LLP

(57) ABSTRACT

A dual clutch for coupling an engine-side input shaft with a first transmission-side and/or a second transmission-side output shaft. A first clutch has a first pressure plate, which is axially mobile relative to a first counter plate, for coupling with a first clutch disk connected to the first output shaft. A second clutch has a second pressure plate, which is axially mobile relative to a second counter plate, for coupling with a clutch disk connected to the second output shaft. A clutch cover is connected to the first and second counter plates. An actuator displaces the first and/or the second pressure plate. The actuator is radially supported on the input side on the input shaft by the clutch cover and a torsional vibration damper, which is connected to the clutch cover and is radially mounted on the output side on one of the output shafts and/or on a transmission housing.

11 Claims, 7 Drawing Sheets

DUAL CLUTCH

CROSS-REFERENCE TO RELATED APPLICATIONS

This application is a continuation application of PCT/DE/000266 filed Mar. 15, 2011, which in turn claims the priority DE 10 2010 012 862.7 filed Mar. 25, 2010, the priority of these applications is hereby claimed and these applications are incorporated by reference herein.

BACKGROUND OF THE INVENTION

1. Field of the Invention

The invention relates to a dual clutch for coupling a motor-side input shaft substantially without an interruption in tractive force to two transmission-side output shafts which are arranged coaxially with respect to one another.

2. Description of the Prior Art

EP 1 524 446 A1 discloses a dual clutch for coupling a motor-side input shaft to two different output shafts which are arranged coaxially with respect to one another. The dual clutch has a first clutch and a second clutch, wherein the respective clutch has a pressure plate which can move axially relative to an opposing plate and has the purpose of coupling the respective clutch to the associated output shaft. In addition, a co-rotating clutch cover is provided which is screwed to the second opposing plate of the second clutch, which is in turn screwed to the first opposing plate of the first clutch. In addition, a secured activation device for moving the first pressure plate and/or the second pressure plate is provided. The activation device is screwed in the axial direction to a secured transmission housing, wherein, in order to absorb the forces occurring at the activation device, a multiplicity of attachment means which extend axially are provided.

There is a constant need for the design of dual clutches to be simplified and, in particular, for forces which occur to be dissipated easily.

SUMMARY OF THE INVENTION

An object of the invention is to provide a dual clutch which permits a simplified design which makes it possible, in particular, for forces which occur to be dissipated in a simplified fashion.

The dual clutch according to the invention for coupling a motor-side input shaft to a first transmission-side output shaft and/or to a second transmission-side output shaft has a first clutch which has a first pressure plate which can be moved axially relative to a first opposing plate and has the purpose of coupling a first clutch plate which is connected to the first output shaft. In addition, a second clutch is provided which has a second pressure plate which can move axially relative to a second opposing plate and has the purpose of coupling a second clutch plate which is connected to the second output shaft. A co-rotating clutch cover is connected to the first opposing plate and to the second opposing plate. In addition, an activation device for moving the first pressure plate and/or the second pressure plate is provided, wherein according to the invention the activation device is supported on the input shaft on the input side via the clutch cover and a drive plate or flex plate which is indirectly or directly connected to the clutch cover, and said activation device is mounted radially on the output side on one of the output shafts and/or on a transmission housing.

Since the activation device is supported on the input side, that is to say at the location where the force flux is applied to the dual clutch from the input shaft, and on the output side, that is to say at the location where the force flux leaves the dual clutch via the respective output shaft, the activation device's own weight and drag torques occurring at the activation device are, in particular, transferred radially. In particular, it is not necessary to transfer forces occurring in the radial direction via axially extending attachment means, with the result that large shearing forces which occur at the axial attachment means are avoided. Axial forces occurring during the axial displacement of the respective pressure plate can, in particular, be particularly easily transferred by virtue of the fact that at its axial end the activation device abuts against the transmission housing. In order to transfer the forces occurring in the radial direction, a fixed bearing or sliding bearing of simple design is sufficient in order to support the activation device radially, in particular on the output side. At the same time, the activation device is mounted on the output side with the result that it is still possible for a relative movement of the activation device to occur in the circumferential direction and/or in the axial direction with respect to the output shaft, or transmission housing, which is used as a support. In addition, the activation device is supported radially on the input side via components which are present in any case, with the result that the forces which occur can be distributed in the radial direction between at least two supporting locations. This leads to a simplified design of the dual clutch and simplified dissipation of forces occurring at the activation device. In addition, the component loading at the supporting points may be comparatively small, with the result that the corresponding components can be produced and mounted in a correspondingly simple and cost-effective fashion.

The respective pressure plate can be connected via a toothing to the respective output shaft in a rotationally fixed but axially movable fashion. The first opposing plate or the second opposing plate can protrude radially inward, as a separate component, from a radially outer transmission housing wall and/or from the clutch cover. It is also possible for the first opposing plate or the second opposing plate to be formed in one piece with the transmission housing wall and/or with the clutch cover. For example, one of the opposing plates can be formed by a flywheel which is connected to the motor-side input shaft, or an output flange of a two-mass flywheel. The respective clutch plate can have in each case one friction lining on, in particular, axial end faces pointing away from one another, which friction lining can enter into frictionally locking contact with a friction lining which is provided, if appropriate, on the associated opposing plate and/or pressure plate, in order to close the respective clutch. The respective clutch plate can be connected in a rotationally fixed but axially movable fashion via a toothing to the respective output shaft. The respective pressure plates and opposing plates are configured, in particular, as separate, functionally separated components, with the result that what is referred to as a "four-plate design" is possible for the dual clutch without significantly increasing the installation space. The dual clutch can be connected directly or indirectly, in particular, to a vibration damper, in particular two-mass flywheel and/or centrifugal force pendulum and/or mass pendulum, which is mounted upstream on the motor side and/or downstream on the transmission side. In addition, the respective clutch disk can, in particular, be damped using a two-mass flywheel and/or centrifugal force pendulum and/or mass pendulum. The drive plate and/or the flex plate can be embodied by means of a rigid plate (drive plate) or bendable and/or flexible plate (flex plate), wherein the plate can transmit torques in order to be able to apply the torque of the input shaft to the dual clutch. As a result of the flexible configuration of the plate, vibrations which occur can be damped or attenuated entirely or partially.

In particular, the activation device is supported on one of the output shafts by means of a bearing, in particular a radial needle bearing. The bearing can have, in particular in the axial direction, a sufficiently large extent with the result that the forces applied by the activation device can be distributed over a correspondingly large surface. The component loading of the bearing can therefore be correspondingly low. In particular, if the bearing is configured as a needle bearing, the bearing consequently has only a small extent in the radial direction, with the result that the installation space is not substantially increased in the radial direction. In particular, a gap can be provided between the activation device and the outer output shaft, by means of which gap the activation device is arranged spaced apart from the outer output shaft. The gap can, in particular, be bridged exclusively by means of the bearing, with the result that further supports of the activation device on the corresponding output shaft, for example via an additional sliding bearing, are not necessary.

The bearing is preferably arranged at an input-side and/or output-side axial end of the activation device. The bearing can, as a result, be inserted into the activation device at the input end and/or output end. As a result, the mounting of the bearing is simplified. It is not necessary to insert the bearing into the activation device, for example centrally with respect to the activation device, using a tool up to a point which is comparatively difficult to access. In particular, it is possible to press the bearing into the activation device, and it is therefore not necessary to secure the bearing axially using securing rings.

The activation device particularly preferably has a radially outwardly protruding bearing block, in particular running around in an annular shape, in order to bear against a radially inwardly pointing bearing face of the transmission housing, wherein, in particular, the curvature of the bearing block is selected such that a theoretical center point of the curvature of the bearing block lies substantially on a rotational axis of the first output shaft and of the second output shaft. As a result of the bearing block, tilting torques acting on the activation device can be compensated and at the same time forces occurring in the radial direction can be transferred to the transmission housing. The curvature of the bearing block provides line-shaped contact between the activation device and the transmission housing, with the result that tilting of the activation device in the transmission housing is avoided.

In particular, a cover bearing is provided between the activation device and the clutch cover, where, in particular, the activation device is mounted on the output side in the axial direction at least partially at the height of the cover bearing. As a result of the cover bearing, forces occurring at the activation device can be transferred to the clutch cover. At the same time it is ensured that the co-rotating clutch cover can carry out a relative movement with respect to the activation device. In particular if the bearing of the activation device is not provided in an axially offset fashion with respect to the cover bearing, forces occurring in the activation device can be transferred radially outwardly via the cover bearing or radially inwardly via the bearing arrangement without unnecessarily large tilting torques and bending torques being produced.

The activation device is particularly preferably connected to the first pressure plate via a first activation pot which has a substantially radially extending first part, and is particularly preferably connected to the second pressure plate via a second activation pot which has a substantially radially extending second part, wherein the cover bearing is spaced apart both from the first part of the first activation pot and from the second part of the second activation pot, on the input side or on the output side. If the cover bearing is offset axially on the input side with respect to the first part and with respect to the second part, the forces which occur can be taken up relatively far toward the inside of the dual clutch and can be transferred to the input shaft via the clutch cover. A part of the clutch cover which protrudes in the axial direction is therefore avoided or greatly reduced, with the result that correspondingly small bending torques act on the clutch cover. If the clutch cover is spaced apart on the output side both from the first part and from the second part, the first activation pot and the second activation pot are arranged substantially within the clutch cover. As a result it is not necessary for activation fingers which are connected to the respective pressure plate to be guided through corresponding openings in the clutch cover. The clutch pot can instead engage around both the first activation pot and the second activation pot, without the need to provide openings in the activation pot which can weaken the clutch pot. The clutch pot can as a result be configured in a simpler way and can transmit relatively large forces.

In particular, the cover bearing is arranged in the axial direction next to the activation device, wherein the cover bearing is connected by means of an, in particular, tubular sheet-metal securing element which is connected to the activation device. Since the cover bearing does not have to be arranged radially outside the activation device, the installation space can be reduced in an axial direction. Instead, the cover bearing can be arranged in a region where the cover bearing is arranged in the axial direction at the level of another component, for example one of the pressure plates. As a result, the installation space of the dual clutch is not significantly increased in the axial direction. As a result of the sheet-metal securing element, a radially outwardly protruding attachment can be formed in order to accommodate the cover bearing in a captive fashion between the sheet-metal securing element and the activation device. The sheet-metal securing element can, in particular, be connected to the activation device in a captive fashion on the output side, for example using a securing ring. If appropriate, the sheet-metal securing element can bear on the bearing provided between the activation device and one of the output shafts and can be supported in the radial direction. This leads to a simple design with which forces which occur can be particularly easily transferred.

In particular, the activation device has a first piston for axially moving the first pressure plate using a first activation pot and a second piston for axially moving the second pressure plate by means of a second activation pot, wherein the activation travel of the first piston corresponds substantially to the displacement travel of the first pressure plate and/or the activation travel of the second piston corresponds substantially to the displacement travel of the second pressure plate. As a result, a directly activated, transmission-free clutch is formed. Pivoting of the respective activation pot does not take place, with the result that the corresponding components for permitting pivoting of the respective activation pot can be eliminated. Assuming an ideally rigid activation pot, the activation travel of the respective piston corresponds precisely to the displacement travel of the associated pressure plate. The displacement travel of the respective pressure plate therefore differs from the activation travel of the associated piston only by the travel distance in the axial direction by which the associated activation pot is bent elastically when the respective clutch is activated.

The activation device preferably has a first annular pressure cylinder for moving the first pressure plate, and a second annular pressure cylinder for moving the second pressure plate, wherein the first pressure cylinder and the second pressure cylinder are arranged coaxially with respect to one another. The coaxial arrangement of the pressure cylinders which are configured in an annular shape produces a particularly compact and installation-space-saving design for the activation device. As a result of the compact design of the activation device, the activation device has a comparatively low intrinsic weight, with the result that the activation device's own weight can be transferred from the clutch cover without difficulties.

A first activation pot, which is connected to the first pressure plate, is particularly preferably mounted on the activation device by means of a first pot bearing, and the first pot bearing is arranged at least partially at the level of the first pressure cylinder and/or at the level of the second pressure cylinder radially inwardly with respect to the first pressure cylinder and/or radially inwardly with respect to the second pressure cylinder. Additionally or alternatively, a second activation pot which is connected to the second pressure plate is preferably mounted on the activation device by means of a second pot bearing, and the second pot bearing is arranged at least partially at the level of the first pressure cylinder and/or at the level of the second pressure cylinder radially inwardly with respect to the first pressure cylinder and/or radially inwardly with respect to the second pressure cylinder. The first pot bearing or the second pot bearing can be arranged in the axial direction substantially at least partially at the same axial height with respect to the first pressure cylinder and/or with respect to the second pressure cylinder, with the result that, when viewed in the radial direction, the first pot bearing or the second pot bearing at least partially overlap the first pressure cylinder and/or the second pressure cylinder. The first pressure cylinder and/or the second pressure cylinder can have a correspondingly larger diameter, with the result that the first pot bearing and/or the second pot bearing can be arranged with a correspondingly smaller diameter within the first pressure cylinder and/or within the second pressure cylinder. In particular, the first pot bearing and/or the second pot bearing are guided in a substantially axially extending, preferably annular depressions in the activation device and, in particular, supported both radially inwardly and radially outwardly on the activation device. A first piston which can be activated by the first pressure cylinder does not have to act on the radially inner end of the first activation pot but instead can act on the first activation pot, spaced somewhat apart from the radially inner end of the first activation pot. Correspondingly, a second piston which can be activated by the second pressure cylinder does not have to act on the radially inner end of the second activation pot but rather can act on the second activation pot, spaced somewhat apart from the radially inner end of the second activation pot. As a result of the spaced-apart support of the respective activation pot, forces occurring during the activation of the activation device can also be transferred via the respective pot bearing, with the result that the bending torques which occur in the respective activation pot can be reduced. As a result, a simplified design is made possible, which, in particular, permits simplified dissipation of forces which occur. Since the respective pot bearing does not necessarily have to be arranged axially next to the activation device but instead can be moved into the activation device, the installation space of the dual clutch can be reduced significantly in the axial direction. This permits the output shafts to be correspondingly shortened, with the result that smaller bending torques occur, and/or relatively large loads can be transferred, in the output shafts. A transmission train with such a dual clutch can therefore be made smaller, more compact and at the same time more robust and efficient.

The invention also relates to a dual clutch for coupling a motor-side input shaft to a first transmission-side output shaft and/or to a second transmission-side output shaft, comprising a first clutch which has a first pressure plate which can move axially relative to a first opposing plate and has the purpose of coupling a first clutch plate which is connected to the first output shaft. The dual clutch also has a second clutch which has a second pressure plate which can move axially relative to a second opposing plate and has the purpose of coupling a second clutch disk which is connected to the second output shaft. In addition, an activation device is provided for moving the first pressure plate and/or the second pressure plate, wherein the activation device has a first annular pressure cylinder for moving a first activation pot which is connected to the first pressure plate, and a second annular pressure cylinder for moving a second activation pot which is connected to the second pressure plate. The first activation pot is mounted on the activation device via a first pot bearing, and the first pot bearing is arranged at least partially at the level of the first pressure cylinder and/or at the level of the second pressure cylinder, radially inwardly with respect to the first pressure cylinder and/or radially inwardly with respect to the second pressure cylinder. Additionally or alternatively, the second activation pot is mounted on the activation device via a second pot bearing, and the second pot bearing is arranged at least partially at the level of the first pressure cylinder and/or at the level of the second pressure cylinder radially inwardly with respect to the first pressure cylinder and/or radially inwardly with respect to the second pressure cylinder. The dual clutch can, in particular, be embodied and developed as described above. The dual clutch which is embodied in this way is shorter in the axial direction owing to the radial nesting of the bearing and pressure piston.

The first activation bearing or the second activation bearing can be arranged in the axial direction essentially at least partially at the same axial height with respect to the first pressure cylinder and/or with respect to the second pressure cylinder, with the result that, when considered in the radial direction, the first activation bearing and the second activation bearing at least partially overlap the first pressure cylinder and/or the second pressure cylinder. The first pressure cylinder and/or the second pressure cylinder can have a correspondingly larger diameter, with the result that the first activation bearing and/or the second activation bearing can be arranged with a correspondingly smaller diameter within the first pressure cylinder and/or within the second pressure cylinder. In particular, the first activation bearing and/or the second activation bearing are guided in a substantially axially extending, preferably annular depressions in the activation device, and in particular supported both radially inwardly and radially outwardly on the activation device. A first piston which can be activated by the first pressure cylinder does not have to act on the radially inner end of the first activation element but instead can act on the first activation element, spaced somewhat apart from the radially inner end of the first activation element. Correspondingly, a second piston which can be activated by the second pressure cylinder does not have to act on the radially inner end of the second activation element but rather can act on the second activation element, spaced somewhat apart from the radially inner end of the second activation element. As a result of the spaced-apart support of the respective activation element, forces which occur during the activation of the activation device can also be transferred via the respective activation bearing, with the result that the bending torques which occur in the respective activation element, such as the activation pot, can be reduced. As a result, a simplified design is made possible which permits, in particular, simplified dissipation of forces which occur. Since the respective activation bearing does not necessarily have to be arranged axially next to the activation device but instead can be moved into the activation device, the installation space of the dual clutch can be reduced significantly in the axial direction. This permits the output shafts to be correspondingly shortened, with the result that smaller bending torques occur, and/or larger loads can be transferred in the output shafts. A transmission train having such a dual clutch can therefore be made smaller, more compact and at the same time more robust and more efficient.

The invention also relates to a transmission train for a motor vehicle having a motor-side input shaft, a first transmission-side output shaft, a second transmission-side output shaft and a dual clutch for coupling the input shaft to the first output shaft and/or the second output shaft, wherein the dual clutch can be embodied and developed as described above. As a result of the dual clutch, a simplified design is obtained for the transmission train which permits, in particular, simplified dissipation of forces occurring at the activation device.

The invention will be explained below by way of example on the basis of preferred exemplary embodiments and with reference to the appended drawings, in which:

DETAILED DESCRIPTION OF THE PREFERRED EMBODIMENTS

Figure 1:
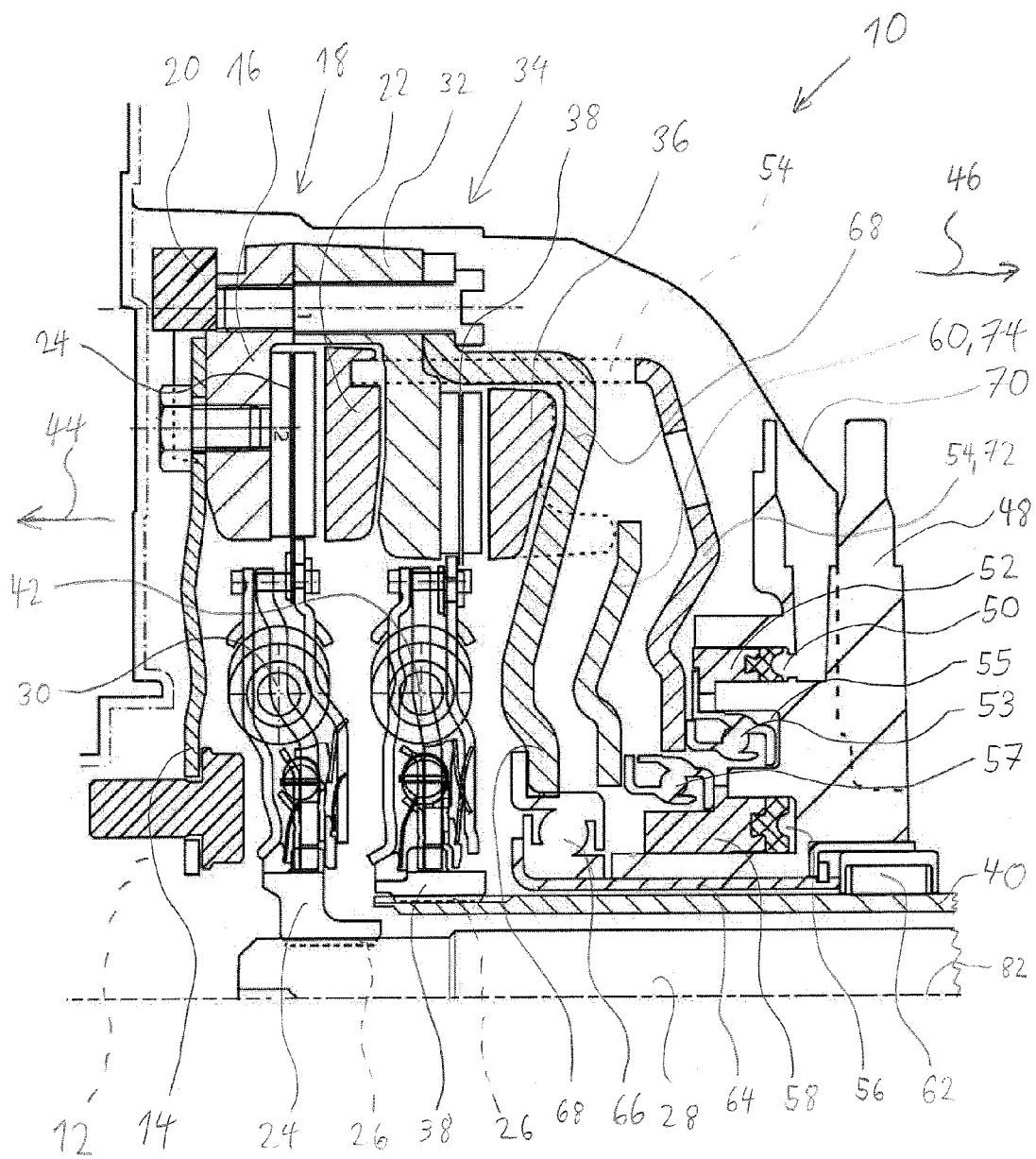
FIG. 1 shows a schematic, simplified sectional view of a dual clutch according to the invention in a first embodiment.

In the dual clutch 10 illustrated in FIG. 1, an input shaft 12 is connected to a rotational oscillation damper in the form of a flex plate 14. The flex plate 14 is connected to a first opposing plate 16 of a first clutch 18. The first opposing plate 16 is also connected to a starter ring 20. The first clutch 18 also has a first pressure plate 22 which can be moved toward the first opposing plate 16 in order to connect a first clutch disk 24 in a frictionally locking fashion between the first opposing plate 16 and the first pressure plate 22. The first clutch plate 24 is connected in a rotationally fixed but axially movable fashion to a first output shaft 28 via a toothing 26. In the illustrated exemplary embodiment, the first clutch plate 24 has a first two-mass flywheel 30 radially on the inside with respect to the first opposing plate 16 and with respect to the first pressure plate 22. The first opposing plate 16 is also connected to a second opposing plate 32 of a second clutch 34. The second clutch 34 has a second pressure plate 36 which can be moved toward the second opposing plate 32 in order to couple a second clutch plate 38 in a frictionally locking fashion. The second clutch plate 38 can also be connected in a rotationally fixed but axially movable fashion to a second output shaft 40 via a toothing 26. In the illustrated exemplary embodiment, the first clutch plate 38 has a second two-mass flywheel 42. An input-side direction 44 is defined by the side on which the force flux is applied to the dual clutch 10 from the input shaft 12. Correspondingly, an output-side direction 46 is defined by the side on which the force flux leaves the dual clutch 10 via the output shafts 28, 40.

In order to activate the first pressure plate 22 and the second pressure plate 36, an activation device 48 is provided. The activation device 48 has a first annular pressure cylinder 50, by means of which a first piston 52 can be disengaged. As a result, a first activation pot 54 can be pushed in a purely axial fashion in order to move the first pressure plate 22 toward the first opposing plate 16 in order to close the first clutch 18. Correspondingly, the activation device 48 has a second annular pressure cylinder 56, by means of which a second piston 58 can be disengaged in order to move a second activation pot 60 in a purely axial fashion. The second pressure plate 36 is moved toward the second opposing plate 32 by the second activation pot 60 in order to close the second clutch 34. The first activation pot 54 is mounted on the activation device 48 by means of a first pot bearing 53 in an annular depression 55 of the activation device 48. The first pot bearing 53 is arranged at the level of the first pressure cylinder 50 and at the level of the second pressure cylinder 56 radially on the inside with respect to the first pressure cylinder 50 and radially on the outside with respect to the second pressure cylinder 56. The second activation pot 60 is supported by means of a second pot bearing 57 which is arranged axially next to the activation device 48. However, the second pot bearing 57 can also be arranged at the level of the first pressure cylinder 50 and at the level of the second pressure cylinder 56 radially on the inside with respect to the first pressure cylinder 50 and radially on the inside with respect to the second pressure cylinder 56.

The activation device 48 is radially supported by means of a radial needle bearing 62 on the second output shaft 40 which is arranged coaxially on the outside with respect to the first output shaft 28. In addition, a cover bearing 66 is connected to the activation device 48 via a sheet-metal securing element 64. A clutch cover 68 is mounted by means of the cover bearing 66, wherein the clutch cover 68 is connected to the second opposing plate 32. The clutch cover 68, the second opposing plate 32, the first opposing plate 16 and the flex plate 14 are connected to the input shaft 12 and as a result experience a rotation. The activation device 48 does not rotate and is fixed exactly like a transmission housing 70 of the dual clutch 10. In the illustrated exemplary embodiment, the first activation pot 54 has a substantially radially extending first part 72, wherein the second activation pot 60 correspondingly has a substantially radially extending second part 74. The clutch cover 68 is arranged spaced apart in the axial direction, in the input-side direction 44 both with respect to the first part 72 and with respect to the second part 74.

Figure 2:
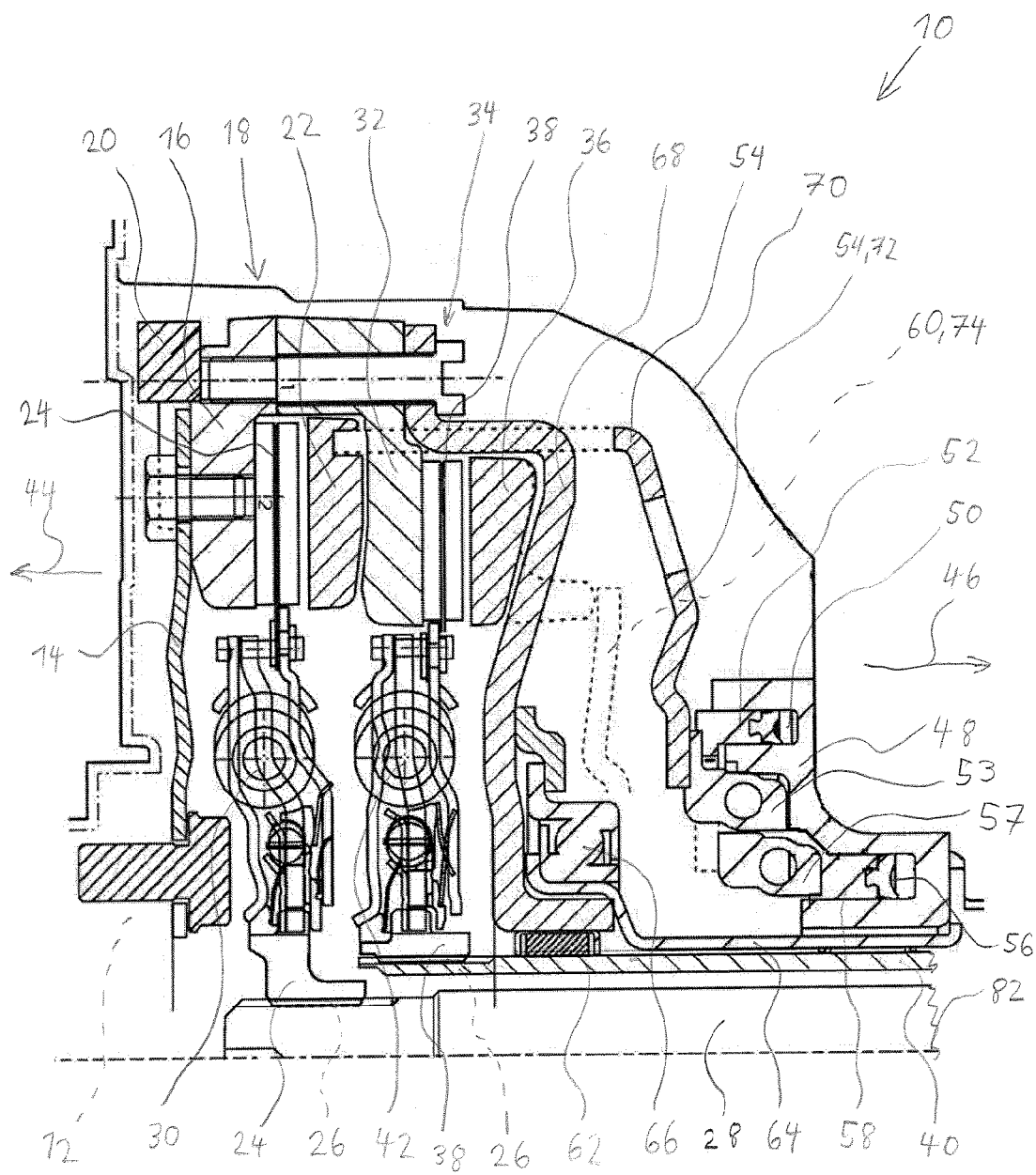
FIG. 2 shows a schematic, simplified sectional view of a dual clutch according to the invention in a second embodiment.

In the embodiment of the dual clutch 10 illustrated in FIG. 2, the needle bearing 62 is arranged at least partially at the level of the cover bearing 66 in the axial direction, in contrast to the embodiment of the dual clutch 10 illustrated in FIG. 1. The needle bearing 62 and the cover bearing 66 are as a result arranged at least partially nested radially one in the other. The needle bearing 62 can for this purpose be inserted in the output-side direction 46 into the sheet-metal securing element 64 or into the clutch cover 70.

Figure 3:
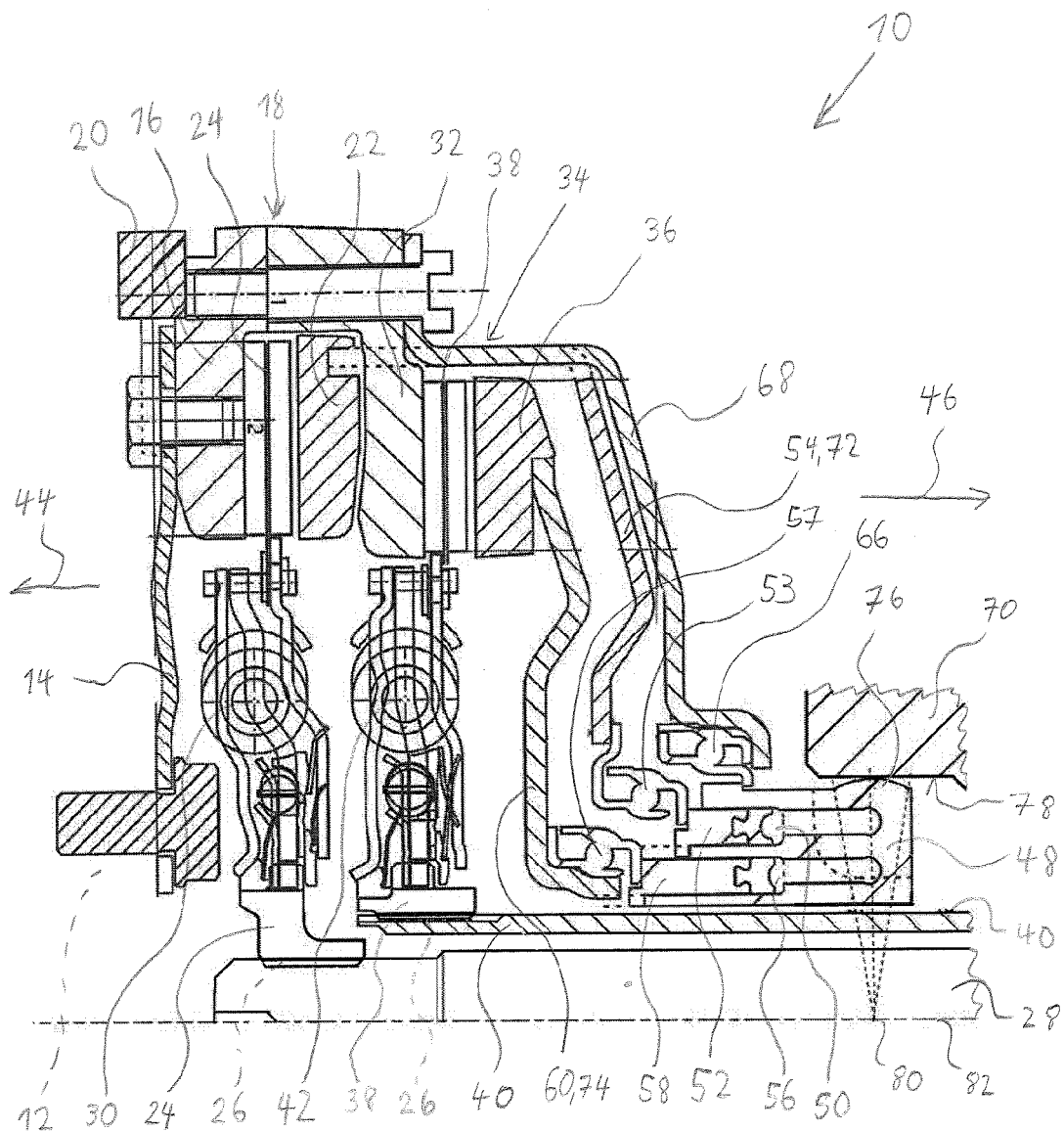
FIG. 3 shows a schematic, simplified sectional view of a dual clutch according to the invention in a third embodiment.

In the embodiment of the dual clutch 10 illustrated in FIG. 3, the needle bearing 62 is in contrast with the dual clutch 10 illustrated in FIG. 1, replaced by a bearing block 76 which is formed by the activation device 48. The bearing block 76 bears against a radially inwardly pointing bearing face 78 of the transmission housing 70. The bearing block 76 is, in particular, annular and circumferential and has a curvature whose theoretical centre point 80 lies on a rotational axis 82 of the coaxially arranged output shafts 28, 40. In addition, the clutch cover 68 and the cover bearing 66 are moved in the output-side direction 46, with the result that the substantially radial first part 72 of the first activation pot 54 and the second part 74 of the second activation pot 60 are spaced apart with respect to the clutch pot 68 in the input-side direction 44. However, it is also possible for the clutch cover 68 and the cover bearing 66 to be configured and arranged as illustrated in FIG. 1.

Figure 4:
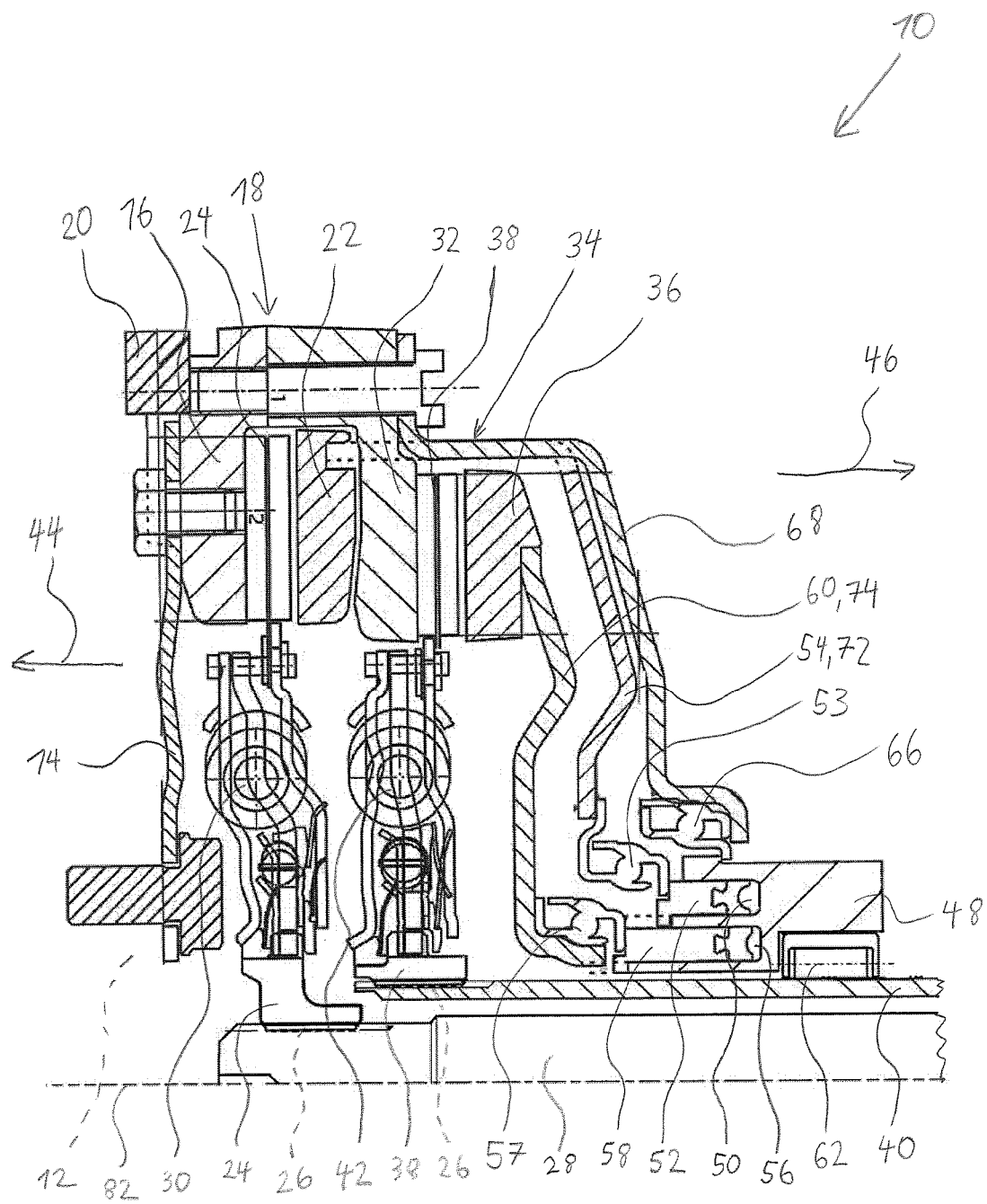
FIG. 4 shows a schematic, simplified sectional view of a dual clutch according to the invention in a fourth embodiment.

In the embodiment of the dual clutch 10 illustrated in FIG. 4, the clutch cover 68 is, in contrast to the embodiment of the dual clutch 10 illustrated in FIG. 1, connected, as illustrated in FIG. 3, to the radial outer side of the activation device 48 via the cover bearing 66.

Figure 5:
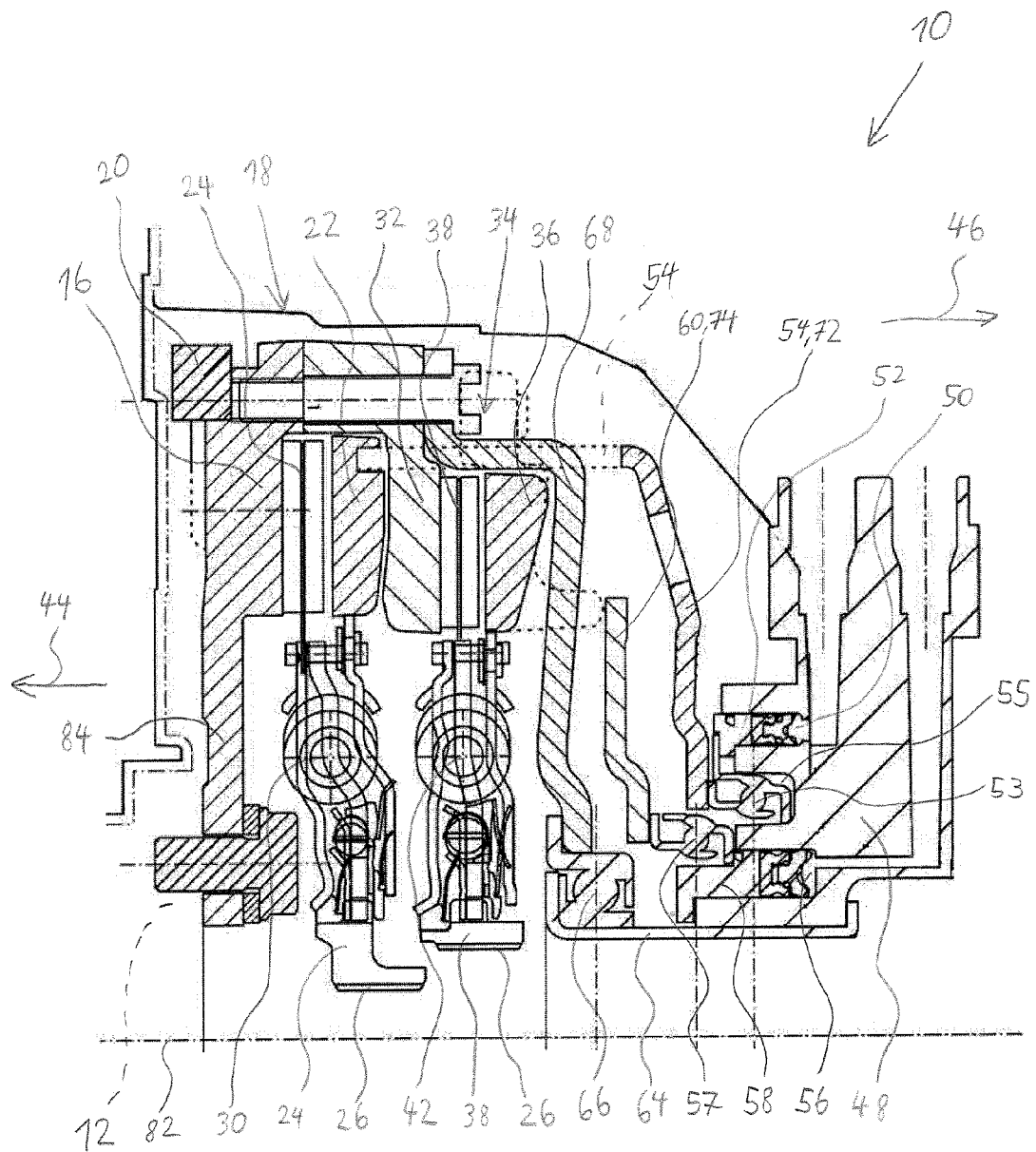
FIG. 5 shows a schematic, simplified sectional view of a dual clutch according to the invention in a fifth embodiment.

The invention also relates to a dual clutch 10 which is illustrated in FIG. 5. In the embodiment of the dual clutch 10 illustrated in FIG. 5, the activation device 48 is only supported radially on the inside by virtue of the fact that the forces which are applied by the activation device 48 are transferred to a flywheel 84 via the cover bearing 66, the clutch cover 68, the second cover plate 32 and the first opposing plate 16, wherein the flywheel 84 is connected to the input shaft 12 in a rotationally fixed fashion. Since the flywheel 84 is of comparatively solid design in order to make available a correspondingly large inert mass, all the forces which occur can be transferred to the input shaft 12 solely via the flywheel 84. The first opposing plate 16 is also formed at the same time as a result of the flywheel 84. The first activation pot 54 is mounted on the activation device 48 in an annular depression 55 in the activation device 48 by means of the first pot bearing 53. The first pot bearing 53 is arranged at the level of the first pressure cylinder 50 and at the level of the second pressure cylinder 56 radially on the inside with respect to the first pressure cylinder 50 and radially on the outside with respect to the second pressure cylinder 56. The second activation pot 60 is supported on the second piston 58 radially on the outside with respect to the second piston 58, by means of a second pot bearing 57 which is arranged axially next to the activation device 48. The second pot bearing 57 can, however, also be arranged at the level of the first pressure cylinder 50 and at the level of the second pressure cylinder 56, radially on the inside with respect to the first pressure cylinder 50 and radially on the inside with respect to the second pressure cylinder 56.

Figure 6:
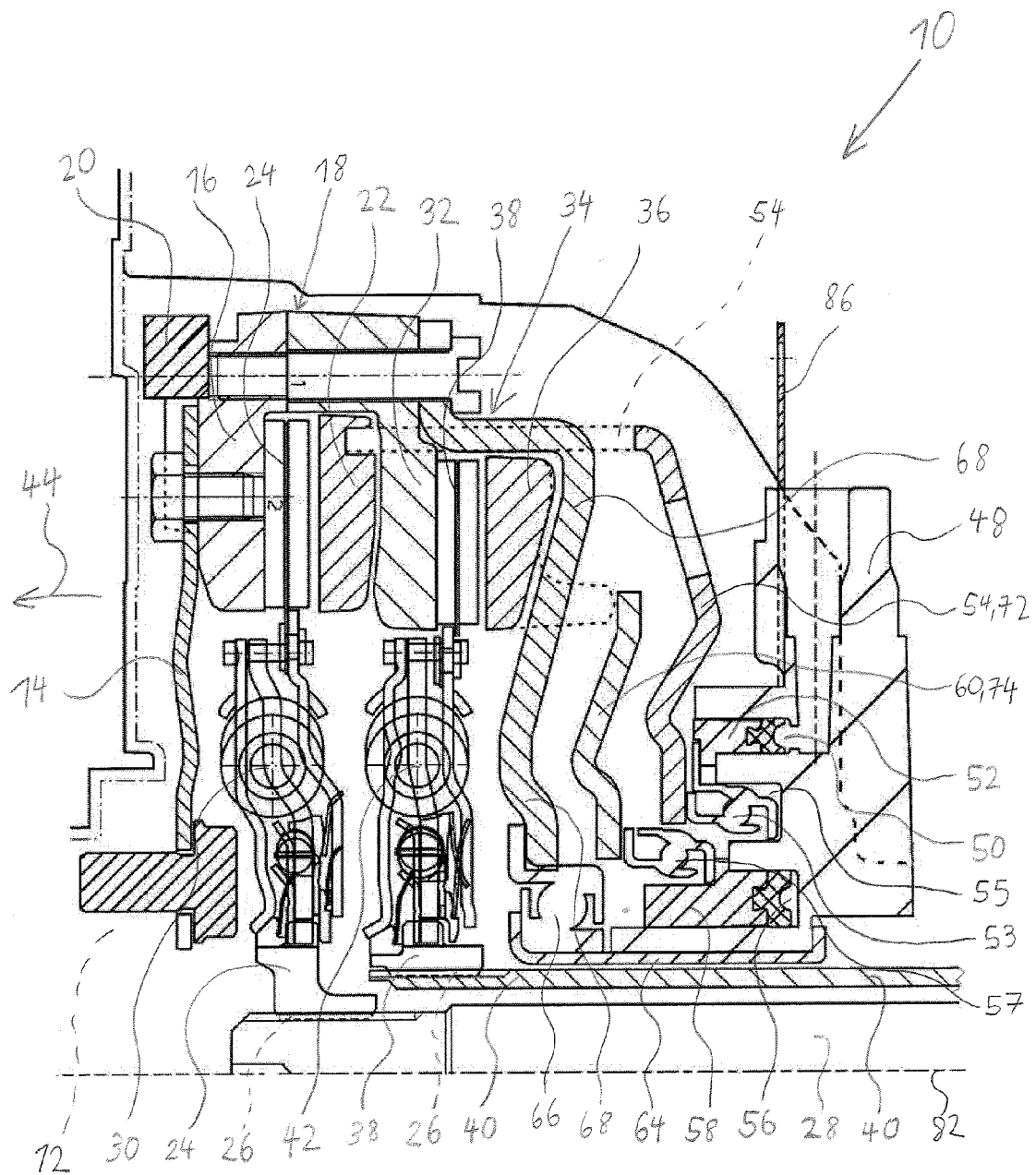
FIG. 6 shows a schematic, simplified sectional view of a dual clutch according to the invention in a sixth embodiment.

The invention also relates to a dual clutch as illustrated in FIG. 6. In the embodiment of the dual clutch 10 illustrated in FIG. 6, the needle bearing 62 is, in contrast to the dual clutch 10 illustrated in FIG. 1, replaced by a flexible element 86, wherein the flexible element 86 can be connected radially on the outside to the transmission housing 70, in particular by screwing or riveting. By means of the flexible element 84, oscillations can be damped and forces which act both radially and axially can be transferred to the transmission housing 70. The first pot bearing 53 is arranged at the level of the first pressure cylinder 50 and at the level of the second pressure cylinder 56, radially on the inside with respect to the first pressure cylinder 50 and radially on the outside with respect to the second pressure cylinder 56. The second activation pot 60 is supported on the second piston 58 by means of a second pot bearing 57 which is arranged axially next to the activation device 48, radially on the outside with respect to the second piston 58. The second pot bearing 57 can, however, also be arranged at the level of the first pressure cylinder 50 and at the level of the second pressure cylinder 56 radially on the inside with respect to the first pressure cylinder 50 and radially on the inside with respect to the second pressure cylinder 56.

Figure 7:
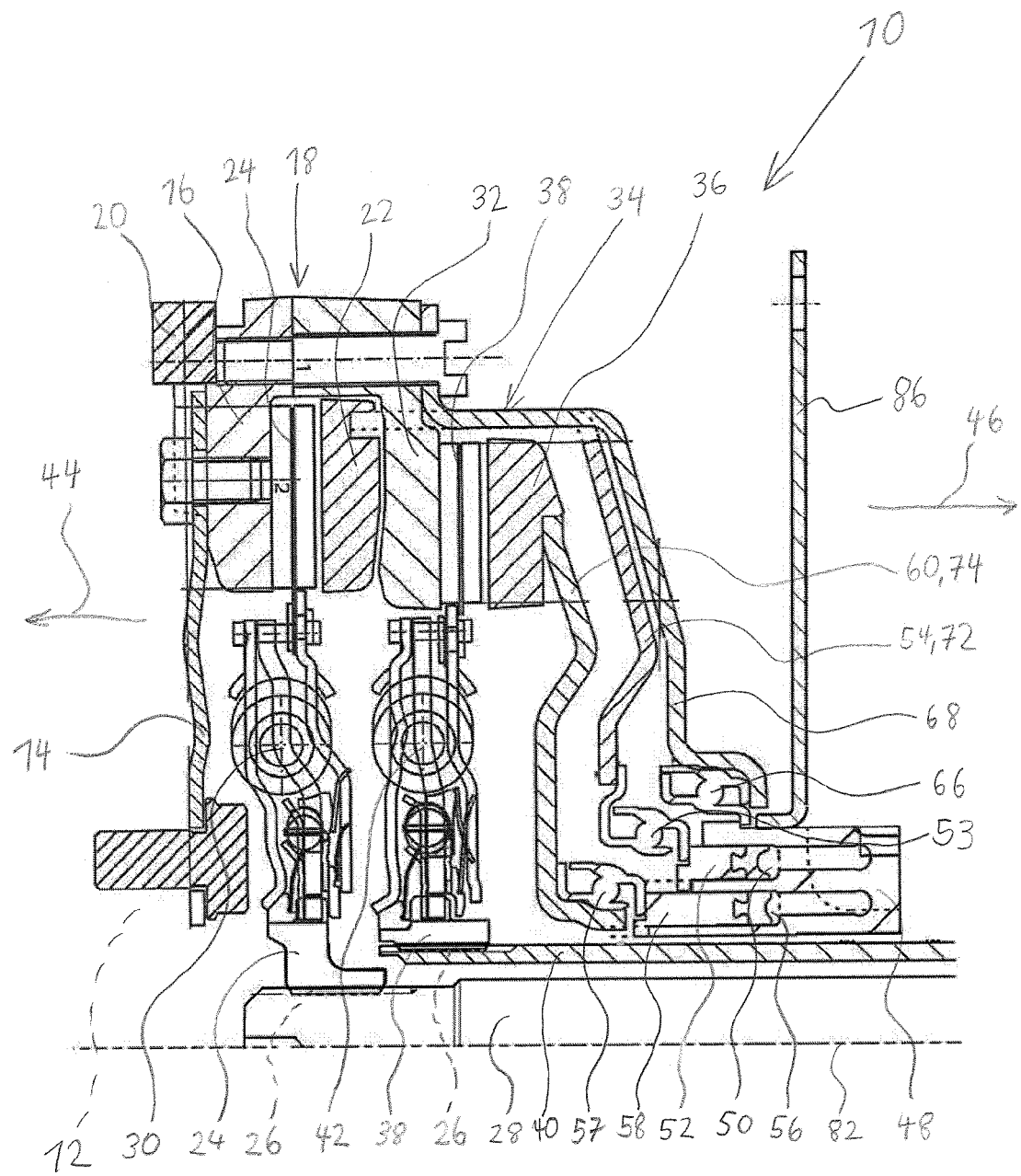
FIG. 7 shows a schematic, simplified sectional view of a dual clutch according to the invention in a seventh embodiment.

The invention also relates to a dual clutch 10 as illustrated in FIG. 7. In the embodiment of the dual clutch 10 illustrated in FIG. 7, the clutch cover 68 and the cover bearing 66 are configured and arranged as in FIG. 3, in contrast to the embodiment of the dual clutch 10 illustrated in FIG. 6.

LIST OF REFERENCE NUMBERS

10 Dual clutch
12 Input shaft
14 Hex plate
16 First opposing plate
18 First clutch
20 Starter ring
22 First pressure plate
24 First clutch plate
26 Toothing
28 First output shaft
30 First two-mass flywheel
32 Second opposing plate
34 Second clutch
36 Second pressure plate
38 Second clutch plate
40 Second output shaft
42 Second two-mass flywheel
44 Input-side direction
46 Output-side direction
48 Activation device
50 First pressure cylinder
52 First piston
53 First pot bearing
54 First activation pot
55 Depression
56 Second pressure cylinder
57 Second pot bearing
58 Second piston
60 Second activation pot
62 Needle bearing
64 Sheet-metal securing element
66 over bearing
68 Clutch cover
70 Transmission housing
72 First part
74 Second part
76 Bearing block
78 Bearing face
80 Center point
82 Rotational axis
84 Flywheel
86 Flexible element

The invention claimed is:
1. A dual clutch for coupling a motor side input shaft to one of a first transmission-side output shaft and a second transmission-side output shaft, the dual clutch comprising:
a first clutch having a first pressure plate, a first opposing plate, and a first clutch disk connectable for fixed rotation with the first output shaft, the first pressure plate being axially movable relative to the first opposing plate for coupling the first clutch disk and the first opposing plate;

a second clutch having a second pressure plate, a second opposing plate and a second clutch disk connectable for fixed rotation with the second transmission-side output shaft, the second pressure plate being axially movable relative to the second opposing plate for coupling the second clutch disk and the second opposing plate;

a clutch cover connected for co-rotation with the first opposing plate and the second opposing plate;

an activation device configured to move at least one of the first pressure plate and the second pressure plate;

one of a drive plate and a flex plate indirectly or directly connected to the clutch cover, the activation device being supported on an input side of the dual clutch by the clutch cover and the one of the drive plate and the flex plate, and the activation device being radially supported at an output side of the dual clutch on one of the first and second transmission-side output shafts;

a cover bearing disposed between the activation device and the clutch cover, wherein the activation device is mounted on the output side at least partially at the axial location of the cover bearing; and a tubular sheet-metal securing element connected to the activation device, wherein the cover bearing is arranged next to the activation device in the axial direction and is connected to the tubular sheet-metal securing element, wherein the tubular sheet-metal securing element is arranged radially inside of the activation device.

2. The dual clutch as claimed in claim 1, further comprising a further bearing for supporting the activation device on one of the first and second transmission-side output shafts.

3. The dual clutch as claimed in claim 2, wherein the further bearing is arranged at least at one of an input-side axial end and an output-side axial end of the activation device.

4. The dual clutch as claimed in claim 2, wherein the further bearing is a radial needle bearing.

5. The dual clutch as claimed in claim 1, wherein the activation device has a radially outwardly protruding annular bearing block to bear against a radially inwardly pointing bearing face of the transmission housing, wherein a curvature of the bearing block is selected such that a theoretical center point of the curvature of the bearing block lies substantially on a rotational axis of the first output shaft and of the second output shaft.

6. The dual clutch as claimed in claim 1, wherein the activation device is connected to the first pressure plate by a first activation pot with a substantially radially extending first part, and the activation device is connected to the second pressure plate by a second activation pot with a substantially radially extending second part, the cover bearing being spaced apart both from the first part of the first activation pot and from the second part of the second activation pot on the input side or on the output side.

7. The dual clutch as claimed in claim 1, wherein the activation device has a first piston for axially moving the first pressure plate by means of a first activation pot, and a second piston for axially moving the second pressure plate by means of a second activation pot, wherein at least one of the activation travel of the first piston corresponds substantially to a displacement travel of the first pressure plate, and the activation travel of the second piston corresponds substantially to a displacement travel of the second pressure plate.

8. A transmission train for a motor vehicle, comprising:
a dual clutch as claimed in claim 1;
a first transmission-side output shaft;
a second transmission-side output shaft; and
a motor-side input shaft.

9. A hydraulic activation device for a dual clutch having first and second pressure plates, first and second opposing plates, and first and second clutch disks, the activation device comprising:
a first activation element operatively connectable to the first pressure plate;
a second activation element operatively connectable to the second pressure plate;
first and second pressure cylinders for moving the first and second activation elements, respectively; and
wherein the first activation element is mounted on the activation device by a first activation bearing arranged radially inside the first pressure cylinder;
wherein the second activation element is mounted on the activation device by a second activation bearing arranged at least partially at the height of the second pressure cylinder, and radially inside the first pressure cylinder; and
a tubular sheet-metal securing element connected to the activation device, wherein a cover bearing is arranged next to the activation device in the axial direction and is connected to the tubular sheet-metal securing element, and wherein the tubular sheet-metal securing element is arranged radially inside of the first pressure cylinder and the second pressure cylinder.

10. A dual clutch for coupling a motor side input shaft to one of a first transmission-side output shaft and a second transmission-side output shaft, the dual clutch comprising:
a first clutch having a first pressure plate, a first opposing plate, and a first clutch disk connectable for fixed rotation with the first output shaft, the first pressure plate being axially movable relative to the first opposing plate for coupling the first clutch disk and the first opposing plate;
a second clutch having a second pressure plate, a second opposing plate, and a second clutch disk connectable for fixed rotation with the second output shaft, the second pressure plate being axially movable relative to the second opposing plate for coupling the second clutch disk and the second opposing plate;
an activation device having a first activation element operatively connected to the first pressure plate and a first annular pressure cylinder for moving the first activation element, and a second activation element operatively connected to the second pressure plate and a second annular pressure cylinder for moving the second activation element,
wherein the first activation element is mounted on the activation device by a first activation bearing arranged radially inside the first pressure cylinder;
wherein the second activation element is mounted on the activation device by a second activation bearing arranged at least partially at the height of the second pressure cylinder, and radially inside the first pressure cylinder; and
a tubular sheet-metal securing element connected to the activation device, wherein a cover bearing is arranged next to the activation device in the axial direction and is connected to the tubular sheet-metal securing element, wherein the tubular sheet-metal securing element is arranged radially inside of the first pressure cylinder and the second pressure cylinder.

11. A transmission train for a motor vehicle, comprising:
a dual clutch as claimed in claim 10;
a first transmission-side output shaft;
a second transmission-side output shaft; and
a motor-side input shaft.

* * * * *